US010581699B2

(12) United States Patent
Ishihara

(10) Patent No.: US 10,581,699 B2
(45) Date of Patent: Mar. 3, 2020

(54) METHOD FOR GENERATING DATA AND WIRELESS CONTROL APPARATUS

(71) Applicant: YAMAHA CORPORATION, Hamamatsu-shi (JP)

(72) Inventor: Kenji Ishihara, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/204,121

(22) Filed: Nov. 29, 2018

(65) Prior Publication Data

US 2019/0097897 A1 Mar. 28, 2019

Related U.S. Application Data

(63) Continuation of application No. PCT/JP2016/066622, filed on Jun. 3, 2016.

(51) Int. Cl.

*H04W 24/00* (2009.01)
*H04L 12/24* (2006.01)
*H04W 24/08* (2009.01)
*H04B 17/23* (2015.01)
*H04B 17/309* (2015.01)
*H04W 16/20* (2009.01)
*H04W 40/22* (2009.01)
*H04W 64/00* (2009.01)

(Continued)

(52) U.S. Cl.

CPC ............ *H04L 41/22* (2013.01); *H04B 17/23* (2015.01); *H04B 17/309* (2015.01); *H04W 16/20* (2013.01); *H04W 24/08* (2013.01); *H04W 40/22* (2013.01); *H04W 64/003* (2013.01); *H04W 88/04* (2013.01); *H04L 41/12* (2013.01); *H04W 8/005* (2013.01); *H04W 84/047* (2013.01); *H04W 84/12* (2013.01); *H04W 84/18* (2013.01); *H04W 88/08* (2013.01)

(58) Field of Classification Search

CPC ........ H04L 41/22; H04W 24/00; H04W 40/02

See application file for complete search history.

(56) References Cited

U.S. PATENT DOCUMENTS

2005/0048965 A1* 3/2005 Ebata .................... H04W 24/00 455/424
2012/0170471 A1* 7/2012 Brown .................. H04W 48/20 370/252
2019/0159105 A1* 5/2019 Watanabe ............... H04L 41/22

FOREIGN PATENT DOCUMENTS

JP 2005080141 A 3/2005
JP 2005094164 A 4/2005

(Continued)

OTHER PUBLICATIONS

International Search Report issued in Intl. Appln. No. PCT/JP2016/066622 dated Aug. 23, 2016. English translation provided.

(Continued)

*Primary Examiner* — Myron Wyche

(74) *Attorney, Agent, or Firm* — Rossi, Kimms & McDowell LLP

(57) ABSTRACT

A method for generating data according to an embodiment of the present invention includes receiving communication-status information regarding a plurality of wireless relays therefrom and generating data for displaying communication statuses included in the communication-status information on a position of a display, the position corresponding to the plurality of wireless relays.

21 Claims, 10 Drawing Sheets

(51) Int. Cl.

| | |
|---|---|
| ***H04W 88/04*** | (2009.01) |
| *H04W 84/12* | (2009.01) |
| *H04W 84/18* | (2009.01) |
| *H04W 84/04* | (2009.01) |
| *H04W 88/08* | (2009.01) |
| *H04W 8/00* | (2009.01) |

(56) References Cited

FOREIGN PATENT DOCUMENTS

| | | |
|---|---|---|
| JP | 2009164882 A | 7/2009 |
| JP | 2011114415 A | 6/2011 |

OTHER PUBLICATIONS

Written Opinion issued in Intl. Appln. No. PCT/JP2016/066622 dated Aug. 23, 2016.
International Preliminary Report on Patentability issued in Intl. Appln. No. PCT/JP2016/066622 dated Dec. 4, 2018.
Written Opinion issued in Intl. Appln. No. PCT/JP2016/066622 dated Aug. 23, 2016. English Translation provided.
Office Action issued in Japanese Application No. 2018-520321 dated Aug. 20, 2019. English translation provided.

* cited by examiner

10:00 March 1, 2016

10:15 March 1, 2016

10:30 March 1, 2016

METHOD FOR GENERATING DATA AND WIRELESS CONTROL APPARATUS

CROSS REFERENCE TO RELATED APPLICATIONS

This application is a U.S. continuation application filed under 35 U.S.C. § 111(a), of International Application No. PCT/JP2016/066622, filed on Jun. 3, 2016, the disclosures of which are incorporated by reference.

FIELD

The present invention relates to a method for generating data and a wireless control device. The present invention particularly relates to a method and a wireless control device capable of grasping a problem occurring in each wireless relay.

BACKGROUND

A technology has been disclosed for displaying a connection state of a plurality of wireless apparatuses connected via a wireless network in connection with a layout of the actual wireless apparatuses (Japanese Patent Application Publication No. 2011-114415).

Although it is possible to grasp how far a radio wave reaches by using the technology disclosed in Japanese Patent Application Publication No. 2011-114415, it is impossible to grasp what kind of problem occurs in each access point (wireless relay).

SUMMARY

According to an embodiment of the present invention, a method is provided. The method includes receiving communication-status information regarding a plurality of wireless relays therefrom and generating data for displaying communication statuses included in the communication-status information at a position on a screen. The position corresponds to the plurality of wireless relays.

According to an embodiment of the present invention, a method realized by a plurality of wireless devices each comprising a wireless control device and a wireless relay is provided. The method includes a step in which the wireless relays of the plurality of wireless devices generate communication-status information regarding the wireless relays in accordance with a communication status with a wireless terminal and a step in which the wireless relays of the plurality of wireless devices transmit the communication-status information to the wireless control device of a first wireless device selected from the plurality of wireless devices. The method further includes a step in which the wireless control device of the first wireless device receives the communication-status information from the wireless relays of the plurality of wireless devices; a step in which the wireless control device of the first wireless device generates data for displaying the communication status included in the communication-status information at a position on a screen, the position corresponding to the wireless relays transmitting the communication-status information; and a step in which the wireless control device of the first wireless device transmits a modifying signal to the plurality of wireless devices other than the first wireless device when the communication-status information transmitted by the wireless relay of the first wireless device satisfies a predetermined requirement. In addition, the method also includes a step in which a second wireless device selected from the plurality of wireless devices other than the first wireless device receives the modifying signal and a step in which the second wireless device sets, on the basis of the modifying signal, the second wireless device so that the wireless control device of the second wireless device receives the communication-status information.

According to an embodiment of the present invention, a wireless control device is provided. The wireless control device includes a first receiving portion receiving communication-status information from a plurality of wireless relays and a generating portion generating data for displaying a communication status included in the communication-status information at a position on a screen. The position corresponds to the plurality of wireless relays.

DESCRIPTION OF EMBODIMENTS

Figure 1:
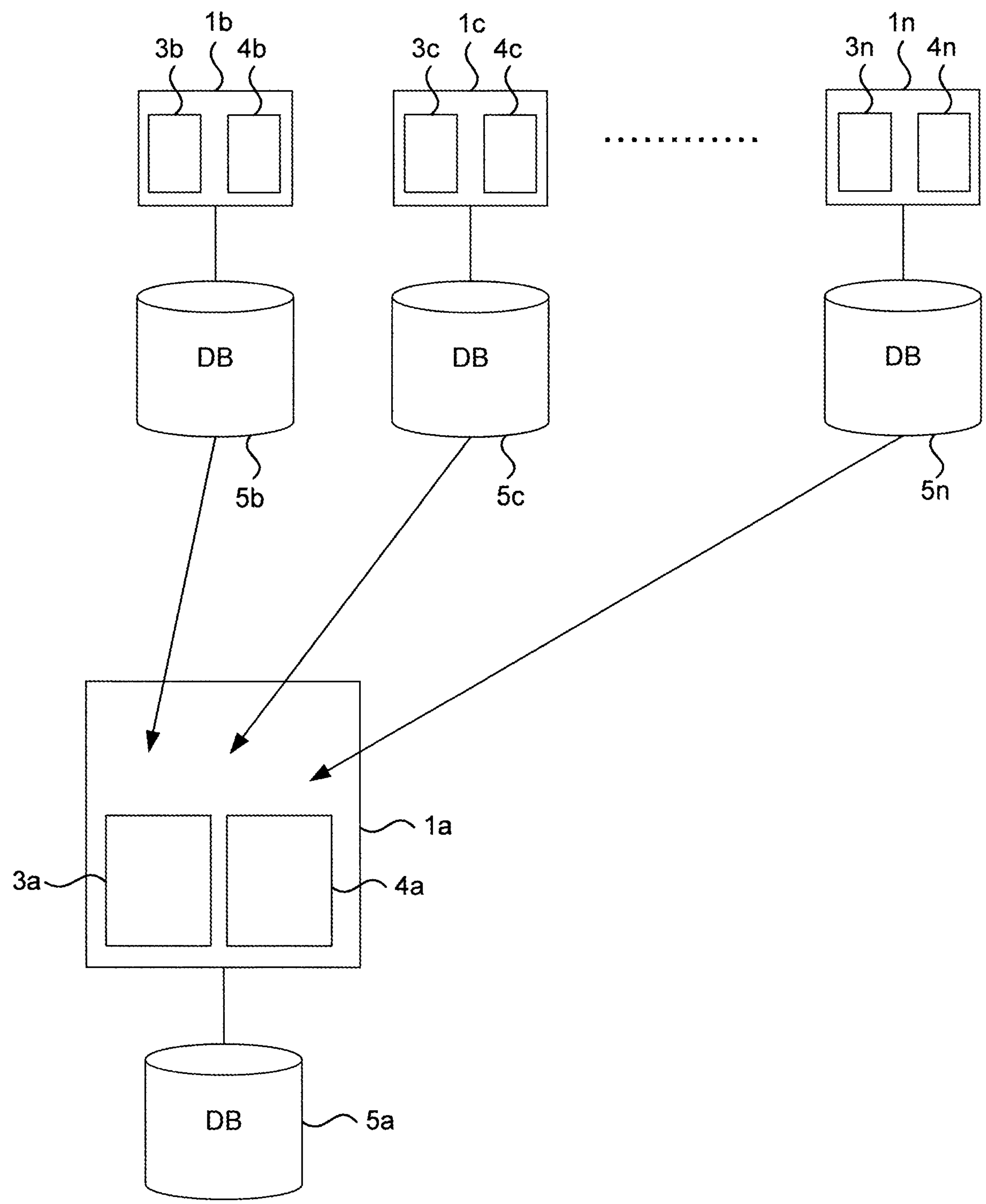
FIG. 1 is a block diagram showing a relationship between a wireless control device and a wireless relay according to an embodiment of the present invention.

Hereinafter, the embodiments of the present invention are explained in detailed with reference to drawings. The following embodiments are merely examples of implementation modes of the present invention, and the present invention is not limited to these embodiments. Note that, in the drawings made reference to in the present embodiment, the same or a similar number (a numeral provided with A, B, or the like after the numeral) is given to the same portion or a portion having the same function, and a repeated explanation thereof may be omitted. In addition, for ease of explanation, a size ratio in the drawings may be different from an actual one, and a part of a structure may be omitted.

A relationship between a wireless device 1*a* and wireless devices 1*b*, 1*c*, . . . , and 1*n* is explained with reference to FIG. 1. FIG. 1 is a block diagram showing a relationship between a wireless control device and a wireless relay according to an embodiment of the present invention. Here, the wireless device 1*a* and the wireless devices 1*b*, 1*c*, . . . , and 1*n* are collectively called a "wireless communication system". As described in detail using FIG. 3, although the wireless device 1*a* includes the wireless control device 3*a* and the wireless relay 4*a*, the wireless device 1*a* may not include the wireless relay 4*a*. When a function of the wireless control device 3*a* of the wireless device 1*a* is explained, a function of the wireless device 1*a* is explained as that of the wireless control device 3*a*. The plurality of wireless devices 1*a*, 1*b*, . . . , and 1*n*, the plurality of wireless control devices 3*a*, 3*b*, . . . , and 3*n*, and the plurality of wireless relays 4*a*, 4*b*, . . . , and 4*n* are illustrated in FIG. 1. When it is not necessary to particularly specify each wireless device, each wireless control device, and each wireless relay, they are individually called a "wireless devices 1", a "wireless control devices 3", and a "wireless relays 4", respectively. Databases 5*a*, 5*b*, . . . , and 5*n* are respectively connected to the wireless devices 1. When it is not necessary to particularly specify the databases 5*a*, 5*b*, . . . , and 5*n*, they are simply called "databases 5". Note that a term "wireless" in the present specification means to transmit a signal through a space using an electromagnetic wave.

In this example, the wireless relay 4 is an access point (AP) of a wireless LAN (Local Area Network). The wireless relay 4 may be a router of a wireless LAN. As explained below in detail, the wireless relay 4 obtains information with respect to an information status. The database 5 memorizes and stores the information obtained by the wireless relay 4.

A wireless terminal (not illustrated) is connected to the wireless relay 4. The wireless terminal includes a mobile communication terminal such as a multi-functional cellular phone, a cellular phone, and a PDA (Personal Digital Assistant), an information-processing terminal, such as a personal computer, having a communication function and an arithmetic function, and the like. The wireless relay 4 possesses a browser as a display-controlling function and includes a CPU, a memory, a communication-controlling portion controlling communication between the wireless relays 4, and the like. The wireless relay 4 may further include an operation-input device such as a mouse, a keyboard, and a touch panel as well as a display.

The wireless devices 1 each include the wireless control device 3 and the wireless relay 4. In this example, the wireless relay 4 is an access point of a wireless LAN. In this example, the wireless device 1*a* controls the plurality of wireless relays 4*b*, 4*c*, . . . , and 4*n* by using the function of the wireless control device 3*a*. The wireless device 1*a* may be called a controller access point (controller AP) in view of the function to control the plurality of wireless relays 4*b*, 4*c*, . . . , and 4*n*. On the other hand, the plurality of wireless relays 4*b*, 4*c*, . . . , and 4*n* controlled by the controller access point may be each called a member access point. The database 5*a* is connected to the wireless device 1*a*. As explained below in detail, the database 5*a* memorizes and stores information received by the wireless control device 3*a* from the wireless relays 4.

<Structure of Wireless Device>

Figure 2:
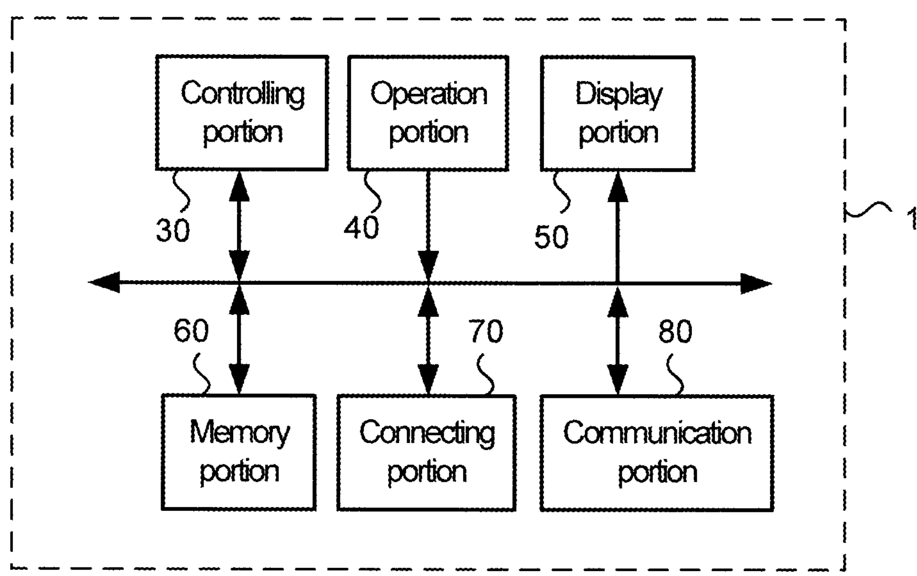
FIG. 2 is a block diagram showing a structure of a wireless device according to an embodiment of the present invention.

Next, a structure of the wireless device 1 is explained using FIG. 2. FIG. 2 is a block diagram showing the structure of the wireless device 1 according to an embodiment of the present invention.

The wireless device 1 has a controlling portion 30, a memory portion 60, an operation portion 40, a display portion 50, a connecting portion 70, and a communication portion 80. Each element is connected via a bus.

The controlling portion 30 includes an arithmetic processing circuit such as a CPU. The controlling portion 30 executes a program stored in the memory portion 60 with a CPU (computer) so as to realize a function for generating display data as described below. A part of or all of this function may be realized not only by executing a program in software but also using hardware. A case where the function is realized with hardware is explained in the following modified example 1. The function realized by the controlling portion 30 includes a function to control each portion of the device in addition to the function for generating display data (display-data generating function). As described in detail in the explanation of FIG. 3, the controlling portion 30 realizes the function as the wireless control device 3 and the function as the wireless relay 4 of the wireless device 1.

The CPU in the controlling portion 30 may have a plurality of arithmetic processing circuits. That is, the CPU may be a multicore processor. In this case, the instructions stored in the memory portion 60 may be independently performed with the plurality of arithmetic processing circuits. For example, one of the instructions may be carried out with one of the plurality of arithmetic processing circuits, while another instruction may be performed with another one of the plurality of arithmetic processing circuits.

The memory portion 60 is a memory device such as a non-volatile memory, and a hard disc. The memory portion 60 includes a memory region for memorizing an application program, such as the aforementioned program, for realizing a variety of functions and a memory region for memorizing setting information set in a setting process or the like. The program may be executed by a computer and may be supplied in a state where the program is stored in a computer-readable recording medium such as a magnetically recording medium, an optically recording medium, an opto-magnetically recording medium, and a semiconductor memory. In this case, the wireless device 1 may be equipped with a device for reading the recording medium. The program may be downloaded via a network.

The operation portion 40 outputs, to the controlling portion 30, a signal corresponding to an operation input by a user through an operation button. The operation button may include, for example, a power switch, a cursor key, and the like and may be an operation element capable of receiving a user's input. The display portion 50 is a display such as a liquid crystal display and an organic EL display and displays a screen (setting screen) controlled by the controlling portion 30. The wireless device 1 may not have both of the operation portion 40 and the display portion 50. In this case, an external device connected to the wireless device 1 may have a function corresponding to the operation portion 40 and the display portion 50. The connecting portion 70 is an interface for connecting with a terminal such as a PC.

The communication portion 80 is connected to a network (not illustrated) and transmits and receives information with an external device under the control of the controlling portion 30. The above descriptions are an explanation for the wireless device 1.

Figure 3:
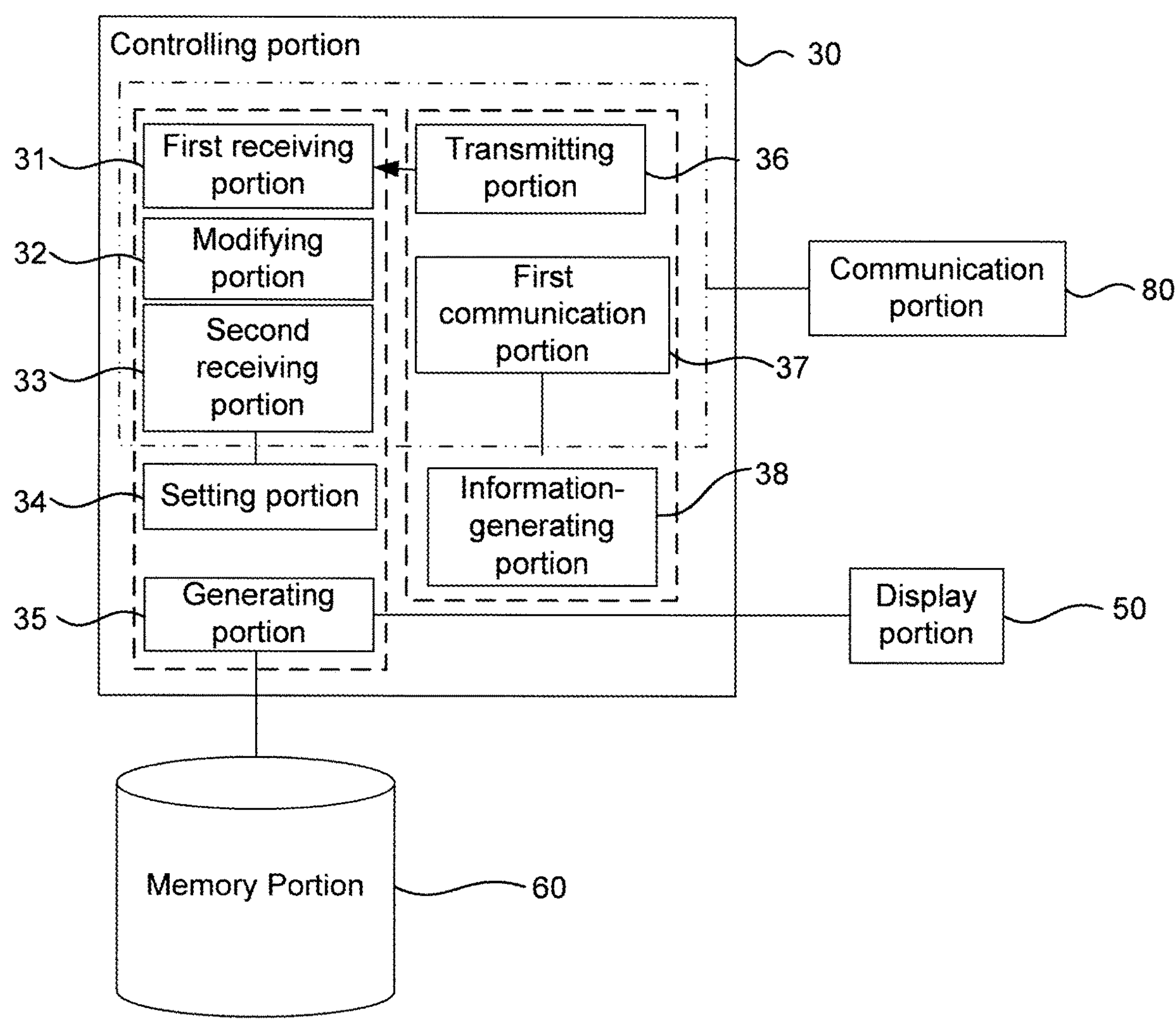
FIG. 3 is a block diagram showing a structure of function blocks of a controlling portion of a wireless device according to an embodiment of the present invention.

Next, a structure of the controlling portion 30 of the wireless device is explained using FIG. 3. FIG. 3 is a block diagram showing a structure of the function blocks of the controlling portion of the wireless device according to an embodiment of the present invention. In FIG. 3, the display portion 50, the memory portion 60, and the communication portion 80 are also illustrated for ease of explanation.

The controlling portion 30 of the wireless device 1 possesses a first receiving portion 31, a modifying portion 32, a second receiving portion 33, a setting portion 34, a generating portion 35, a transmitting portion 36, a first communication portion 37, and an information-generating portion 38. The wireless device 1 includes the control device 3 and the wireless relay 4. The function of the wireless control device 3 is realized by the first receiving portion 31, the modifying portion 32, the second receiving portion 33, the setting portion 34, and the generating portion 35. The function of the wireless relay 4 is realized by the transmitting portion 36, the first communication portion 37, and the data-generating portion 38.

The first communication portion 37 communicates with the wireless terminal. The first communication portion 37 receives, for example, information such as a MAC address and an authentication mode from the wireless terminal.

The data-generating portion 38 generates communication-status information in accordance with a communication state of the first communication portion 37. The communication-status information implies information regarding the communication state between the wireless relay and the wireless terminal connected to the wireless relay. The communication-status information includes information regarding the wireless terminal, information regarding the wireless relay 4, information regarding communication quality, and the like.

The information regarding the wireless terminal is information such as a MAC address, a media type (IEEE 802.11a/b/g/n, etc.), and an authentication mode (open, PSK, WPA, WPA2, etc.) of the wireless terminal, for example. The information generated by the information-generating portion 38 may be one or a plurality of these information items. The information regarding the wireless relay 4 is information such as an IP address, a name, a location, a SSID, and a MAC address, for example. The information generated by the information-generating portion 38 may be one or a plurality of these information items.

The information regarding communication quality is information such as a transmitting rate between the wireless terminal and an access point, intensity of a signal received at an access point from the wireless terminal, a retransmitting rate of a packet from the wireless terminal to an access point, the number of disconnections of wireless communication between the wireless terminal and an access point, the number of terminals being communicating with an access point, a channel-usage ratio of an access point, and a generation rate of a CRC error. The information generated by the data-generation portion 38 may be one or a plurality of these information items.

The transmitting portion 36 transmits the communication-status information generated by the data-generating portion 38 to the predetermined wireless control device. Here, the transmitting portions 36 of the wireless relays 4*b*, 4*c*, . . . , and 4*n* other than that of the wireless relay 4*a* itself may transmit the communication-status information to the wireless control device 3*a* of the wireless device 1*a*. As shown in FIG. 3, the transmitting portion 36 of the wireless relay 4*a* itself may transmit the communication-status information to the first receiving portion 31 of the wireless control device 3*a*.

The first receiving portion 31 receives the communication-status information with respect to the wireless relay 4 from the plurality of wireless relays 4. As described above, the wireless relays 4 are access points in this example.

The generating portion 35 generates data for displaying the communication state indicated by the communication-status information at a position on a screen, where the position corresponds to the wireless relay 4 transmitting the communication-status information. Here, the screen means the screen displayed on the display portion 50. For example, the first receiving portion 31 receives, from the wireless relay 4 of a SSID-2 shown in FIG. 4, the communication-status information with respect to this wireless relay 4. The generating portion 35 generates data for displaying the communication state indicated by this communication-status information at a position on the screen, where the position corresponds to the wireless relay 4 the of SSID-2 which transmits this communication-status information.

The generating portion 35 may generate data so that, when the first receiving portion 31 receivs the communication-status information from the plurality of wireless relays 4, one of the plurality of wireless relays 4 is selected in accordance with the communication-status information and that the communication-status information of the selected wireless relay 4 is displayed. For example, the generating portion 35 may generate data so that the wireless relay 4 having a certain evaluation grade selected from a plurality of evaluation grades described below is selected and that the communication-status information with respect to the selected wireless relay 4 is displayed. Specifically, the generating portion 35 may generate data for selecting and displaying "SERIOUS" among "SERIOUS", "WARNING", "ATTENTION", "PERMISSION", AND "GOOD".

When the transmitting portion 36 of the wireless device having the modifying portion 32 transmits the communication-status information to the wireless control device 3 of this wireless device itself and the communication-status information satisfies a predetermined requirement, the modifying portion 32 of this wireless control device transmits a modifying signal to another wireless device. The modifying signal is a signal for switching this wireless control device to the wireless control device of another wireless device. When a CRC error ratio of a channel used by this wireless relay 4 is equal to or more than a predetermined ratio, it can be considered that the communication-status information satisfies the predetermined requirement. Alternatively, when the communication environment is not preferred, it can be considered that the communication-status information satisfies the predetermined requirement. The communication environment may be considered not to be preferred when there is a channel completely overlapping with the channel used by this wireless relay 4, when a channel-usage ratio is equal to or higher than a predetermined value, when the number of wireless terminals connected to this wireless relay 4 is equal to or more than a predetermined value, or when there is a wireless terminal connected to this wireless relay 4 and the intensity of a signal received therefrom is equal to or less than −70 dBm.

The modifying portion 32 transmits the modifying signal to the wireless device 1*a* when the communication-status information satisfies the predetermined requirement. Here, the modifying signal is a signal for switching the wireless control device 3*a* to which the communication-status information is transmitted from the transmitting portions 36 of the plurality of wireless relays 4 to one of the wireless control devices 3*b* to 3*n* of other wireless devices 1*b* to 1*n*.

The second receiving portion 33 receives the modifying signal from other wireless devices. The setting portion 34 sets the predetermined wireless control device on the basis of the received modifying signal. In other words, the setting portion 34 sets the wireless control device to which the communication-status information is transmitted from the transmitting portion 36 of the wireless relay 4, that is, the wireless device 1.

As described above, the structure of the wireless device 1 is explained. The wireless device 1 may not possess all of the aforementioned elements. The minimum structure of the wireless device 1 includes the first receiving portion 31 and the generating portion 35. Other elements may be appropriately added.

Figure 4:
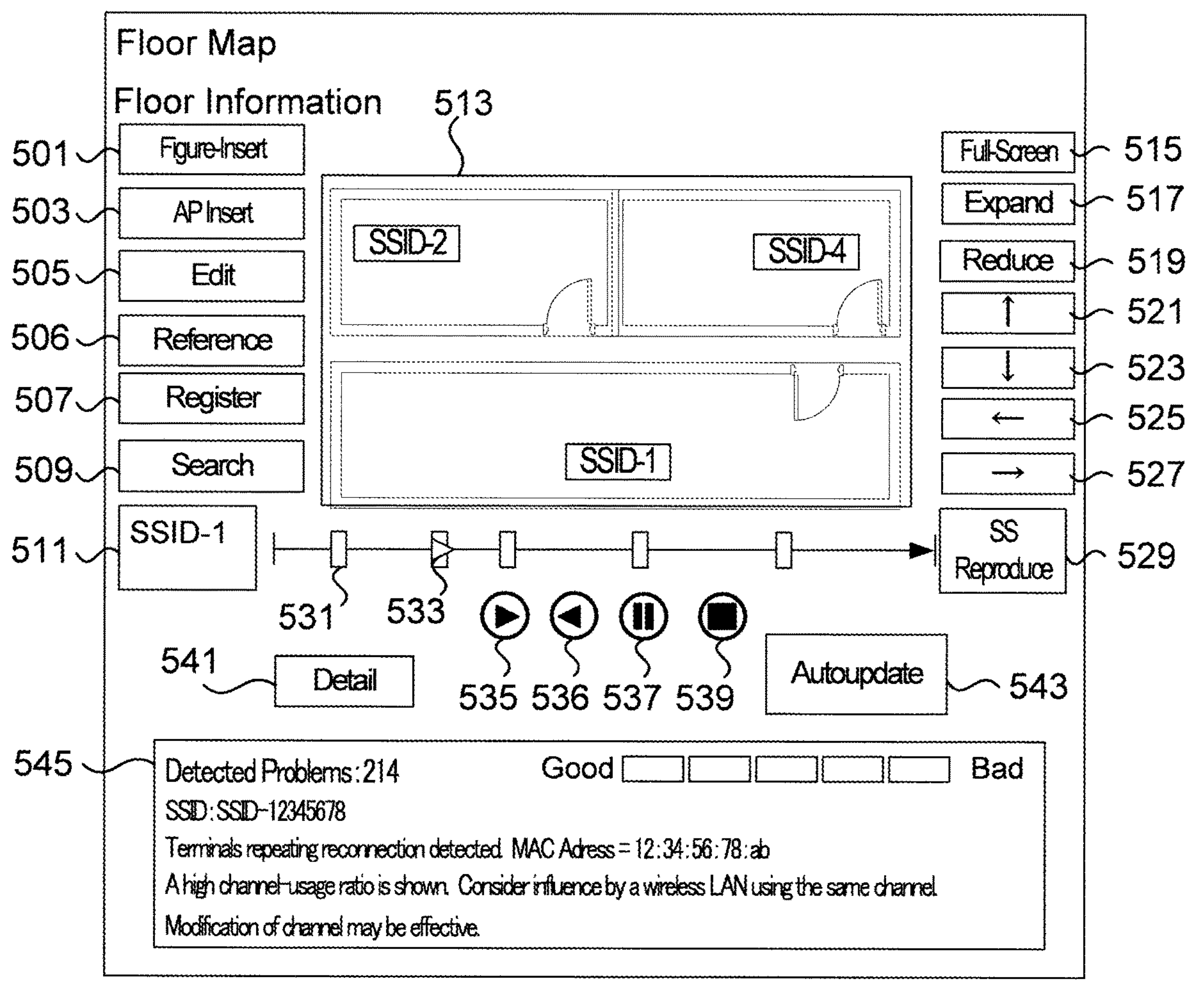
FIG. 4 is an example of a display portion of a wireless device according to an embodiment of the present invention.

Next, display on the display portion 50 of the wireless device 1 is explained using FIG. 4. FIG. 4 shows an example of the display portion of the wireless device according to an embodiment of the present invention.

A figure-inserting button 501, an AP-inserting button 503, an editing button 505, a referring button 506, a registration button 507, a search button 509, a full-screen button 515, an expanding button 517, a reducing button 519, an up button 521, a down button 523, a left button 525, a right button 527, a SS-reproducing button 529, a reproducing button 535, a pausing icon 537, a stopping icon 539, a detailed information button 541, and an auto-updating button 543 shown in FIG. 4 are included in the operation portion 40.

In order to display a floor map 513 on the display portion 50, floor information has to be first registered. In this example, when the figure-inserting button 501 is pressed, a floor chart is imported. The floor chart is an image file such as a bitmap file and a png file. When the AP-inserting button 503 is pressed, the position of the access point is set. In FIG. 4, the access points are located at the positions expressed as “SSID-2”, “SSID-1”, and “SSID-4”. It is also possible to register a material used for a wall and a ceiling. This is because material dependence of transmittivity and reflectivity of a radio wave requires registration of the material. Finally, registration of the floor information is completed by pressing the registration button 507. The floor information which is desired to be displayed can be selected from the registered floor information by pressing the referring button 506. The registered floor information can be edited by pressing the editing button 505. The memory portion 60 or the database 5 memorizes and stores the floor chart and the floor information.

The entire floor is displayed by pressing the full-screen button 515. The display is expanded by pressing the expanding button 517, while the display is reduced by pressing the reducing button 519. Up, down, left, and right directions can be specified by pressing the up button 521, the down button 523, the left button 525, and the right button 527, respectively. Whether the display content is auto-updated or manually updated is selected by pressing the auto-updating button 543. Whether detailed information of the access points is displayed or not is selected by pressing the detailed information button 541.

When the SS (snapshot) reproducing button 529 is pressed, snapshots in a set period are reproduced. A reproducing period of the snapshots desired to be reproduced may be selected by pressing the SS-reproducing button 529. Here, a snapshot includes communication-status information recorded at a specific timing when the communication state of each wireless relay 4 satisfies the predetermined requirement. This communication-status information is recorded in the databases 5 connected to the respective wireless relays 4.

When the SS-reproducing button 529 is pressed, the reproducing period as well as the buttons for reproducing reproduction, stopping reproduction, and the like are displayed, which allows a date and time at which reproduction of the snapshots desired to be reproduced is started and a date and time at which the reproduction is stopped to be set. Since the snapshot is recorded only at a timing when the predetermined requirement is satisfied, there may be no data of a set date. Hence, when a date and time for starting are set and there is no data of the date and time, the oldest date and time are automatically selected. Similarly, when a date and time for stopping are set and there is no data of the date and time, the newest date and time are automatically selected After the date and time are set, the corresponding data is obtained from the database 5 of each wireless relay 4. Icons with a reference numeral 531 indicate that there is a captured snapshot. In this example, the icons with the reference numeral 531 are spaced away from one another. This is because the snapshot is recorded at the timing when the predetermined requirement is satisfied and because the timings when the predetermined requirement is satisfied are far from each other. If the predetermined requirement is successively satisfied, the icons with the reference numeral 531 continue.

When the reproducing icon 535 is pressed, the snapshots are reproduced. In the example of FIG. 4, the snapshot at the point of the icon with the reference numeral 531 is reproduced. When a reverse reproduction icon 536 is pressed, the snapshots are reversely reproduced. When the pausing icon 537 is pressed, reproduction is temporarily stopped. When the stopping icon 539 is pressed, reproduction is stopped. In the case where an icon for displaying additional information (not shown) is pressed when reproduction is stopped or temporarily stopped, a comment in a column 545 for displaying additional information is updated. The column 545 for displaying additional information is marked with “Good” and “Bad”, and five rectangles are provided therebetween. Different colors or different letters may be added to the five rectangles. Namely, the five rectangles correspond to the respective grades. In this example, five rectangles respectively correspond to “GOOD”, “PERMISSION”, “WARNING”, “ATTENTION”, and “SERIOUS” from a side marked with “GOOD”. The number and meaning of the rectangles may be appropriately set. For example, when the number of the rectangles is three, the number of the grades is three. The rectangles may imply a symbol such as “A”, “B”, and “C”. An evaluation criterion is determined on the basis of the communication-status information. “SSID-2”, “SSID-1”, and “SSID-4” in FIG. 4 each have a color corresponding to the colors of the five rectangles. As such, display is carried out with the colors and letters representing the evaluation in accordance with the plurality of grades such as “GOOD”, “PERMISSION”, “WARNING”, “ATTENTION”, and “SERIOUS”. Therefore, even a user without technical knowledge can judge the importance of problems.

The above description explains the display of the display portion 50. The details of the snapshot are explained below.

<Snapshot Function of Wireless Control Device>

Figure 5:
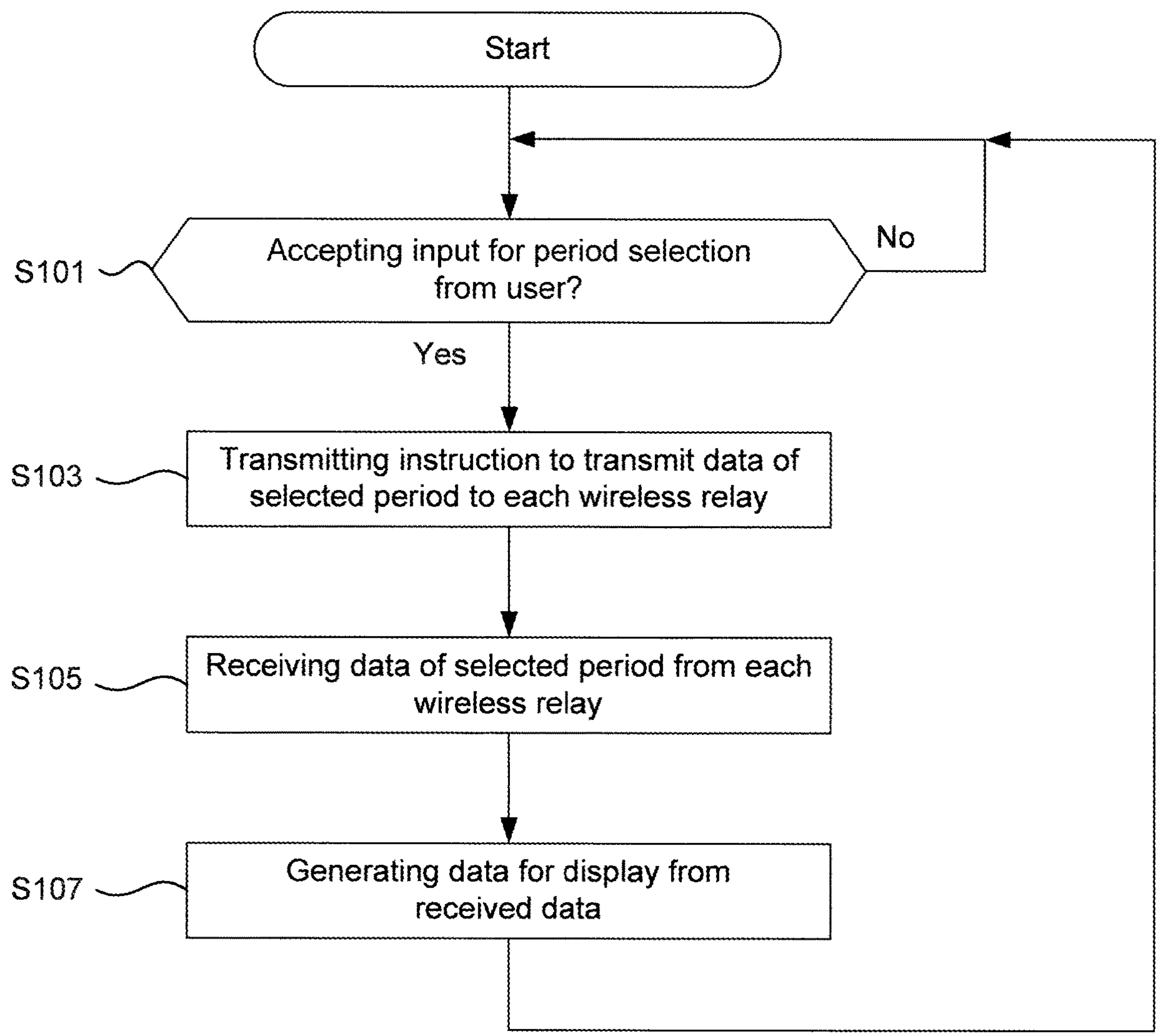
FIG. 5 is a flow chart showing an operation example in a case of utilizing a snapshot function of a wireless control device according to an embodiment of the present invention.
Figure 6:
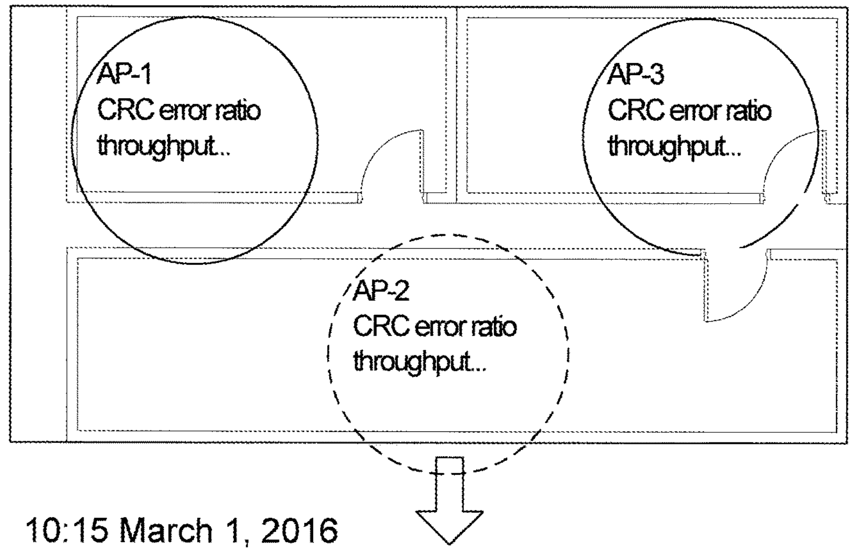
FIG. 6 is a conceptional drawing for explaining a snapshot function of a wireless control device according to an embodiment of the present invention.
Figure 6:
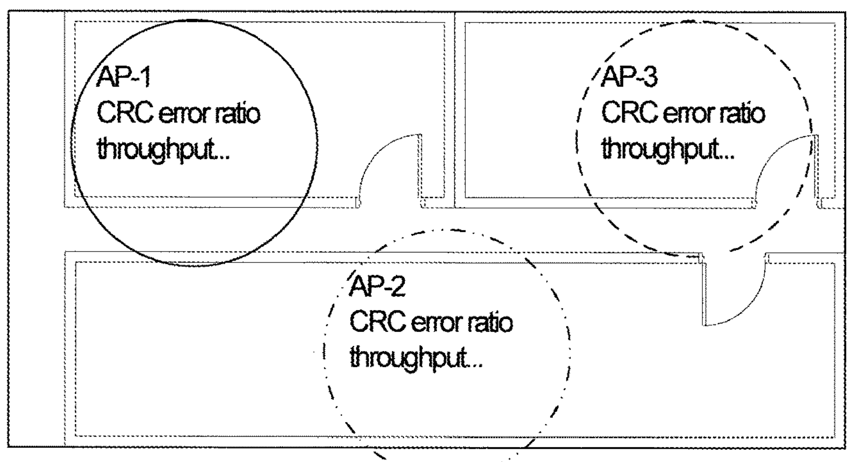
Figure 6:
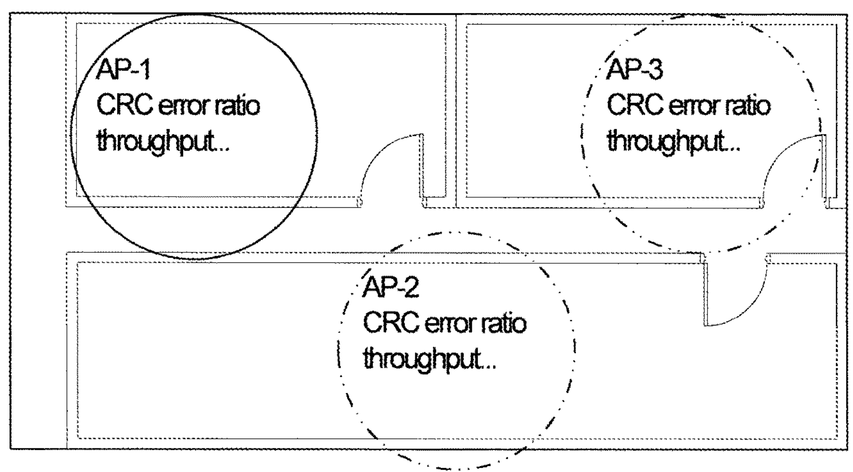

A snapshot function of the wireless control device 3 in the wireless device 1 is explained using FIG. 5 and FIG. 6. FIG. 5 is a flow chart showing an operation example in the case of using the snapshot function of the wireless control device according to an embodiment of the present invention. FIG. 6 is a conceptual drawing for explaining the snapshot function of the wireless control device according to an embodiment of the present invention. In this example, an explanation is given for the case where the wireless device 1 executes the function of the wireless control device 3 is the wireless device 1*a*.

First, the SS-reproducing button 529 shown in FIG. 4 is pressed by a user, and whether an input for selecting a period for capturing a snapshot is accepted or not is judged (Step S101). The process loops until this input is accepted. After this input is accepted (in the case of YES in Step 101), the wireless control device 3*a* transmits, to each wireless relay 4, an instruction for transmitting the communication-status information in the selected period to each wireless relay 4 (Step S103).

The first receiving portion 31 receives the communication-status information of the selected period from each wireless relay 4 (Step S105). Specifically, the first receiving portion 31 receives, from the wireless relay 4, the communication-status information corresponding to the input period after receiving the input of the period selection from the user. In other words, the first receiving portion 31 receives the communication-status information recorded in the wireless relay 4 at a timing when the communication status of the wireless relay 4 satisfies the predetermined condition. If the first receiving portion 31 cannot receive the communication-status information in the selected period, the wireless control device 3a may request each wireless relay 4 to retransmit the communication-status information of the selected period or may stop the process and wait until the input for period selection is input again by the user.

The main purpose of the snapshot function is to grasp a problem which occurs in each wireless relay (access point) 4. Therefore, the information desired to be recorded in the database 5 of each access point 4 is necessary for grasping the problem of each access point 4. Here, the timing when the communication state of the access point 4 satisfies the predetermined requirement means a timing when the information necessary for grasping that a problem has occurred in the access point 4 is generated. For example, it can be recognized that the communication status satisfies the predetermined requirement when a CRC error rate of a channel used by a local station (the access point) is equal to or more than a predetermined value. It can be also recognized that the communication status satisfies the predetermined requirement in the case where the communication environment is not preferred, which is exemplified by the case where there is a channel completely overlapping with the channel used by the local station, the case where a channel-usage ratio is equal to or higher than a predetermined value, the case where the number of wireless terminals connected to the local station is equal to or more than a predetermined value, the case where intensity of a signal from a wireless terminal connected to the local station is equal to or less than −70 dBm when received at the local station, and the like.

The communication-status information received by the first receiving portion 31 may be a log number in which content is fixed in advance. That is, a log number is associated with its content fixed in advance and stored in the databases 5b, 5c, . . . , and 5n of the access points 4b, 4c, . . . , and 4n and in the memory portion 60 or the database 5a of the wireless control device 3. For instance, a log number "1-1-1" and content that "a channel-usage ratio becomes 20% or more" are associated with each other. Then, a threshold that a channel-usage ratio is 20% or more is set in the access point 4. When the access point 4 judges that the channel-usage ratio exceeds this threshold, the log number "1-1-1" is transmitted to the wireless control device 3a, and the first receiving portion 31 receives this log number. It is possible to reduce communication traffic by transmitting and receiving the log number.

When the communication-status information is received by the first receiving portion 31, the generating portion 35 generates data for displaying the communication status based on the communication-status information at the positions of the plurality of wireless relays 4 which are set on the screen by associating with the plurality of wireless relays 4. In this example, the generating portion 35 generates data for displaying the communication status on the basis of the received communication-status information. However, the generating portion 35 may first record the received communication-status information and then generate data for displaying the communication status on the basis of the communication-status information recorded in this database 5.

In this operation example, an explanation is made for a case where the display device 50 is located outside the wireless control device 3a. However, when the wireless control device 3a possesses the display portion 50, the snapshot may be reproduced on the display portion 50 by pressing the reproducing icon 535 as shown in FIG. 6. In the example shown in FIG. 6, a snapshot at 10:00 of Mar. 1, 2016, a snapshot at 10:15 on the same day, and a snapshot at 10:30 on the same day are reproduced in this order. Here, an AP-1 which is one of the wireless relays 4 is represented as a circular image in every snapshot. In this example, an image of a circle with a solid circumference means that the communication environment is "GOOD" as explained in FIG. 4. An image of a circle with a broken circumference means that the communication environment is "ATTENTION", while an image of a circle with a chain double-dashed circumference means that the communication environment is "SERIOUS". In this example, a difference in meaning is expressed by using a broken circumference, a chain double-dashed circumference, or the like, and the difference may be expressed using colors and letters.

As described above, when the communication status satisfies the predetermined requirement, each wireless relay 4 records the information regarding this communication status in the database 5. Hence, an amount of information to be recorded can be reduced.

The communication-status information of each wireless relay 4 is not recorded in the database 5a connected to the wireless control device 3a, but the communication-status information of each of the wireless relays 4b, 4c, . . . , and 4n is dispersedly recorded in the corresponding databases 5b, 5c, . . . , and 5n. When the snapshot function is utilized, the first receiving portion 31 of the wireless control device 3a merely receives the communication-status information recorded in the database 5 of each wireless relay 4. Therefore, if the communication-status information of each wireless relay device 4 is recorded in the database 5a connected to the wireless control device 3a, the system of the wireless control device 3a may crash and the communication-status information of all of the wireless relays 4 may not be able to be recorded. On the other hand, in the case where the communication-status information of each of the wireless relays 4b, 4c, . . . , and 4n is dispersedly recorded in the databases 5b, 5c, . . . and 5n as demonstrated in the present embodiment, such an accident can be avoided.

When the snapshots are reproduced, variation in the communication environment of each wireless relay 4 with time can be monitored as shown in FIG. 6. In addition, since a display is conducted with lines, colors, and letters indicating each of the grades such as "GOOD", "PERMISSION", "ATTENTION", "WARNING", and "SERIOUS", even a user without technical knowledge can judge the importance of problems.

A time interval in monitoring the communication status with each wireless relay 4 depends on the communication status. A state where the time interval is different from each other may be expressed as a difference in size of a particle. For example, the wireless relay device 4 monitors the number of the wireless terminals connected thereto every 10 seconds. For example, the wireless relay device 4 monitors the channel-usage rate every second. For example, the snapshots for the channel-usage rate may be recorded 10 times in 10 seconds, while the snapshots for the number of the wireless terminals connected to the wireless relay 4 may be recorded only once in 10 seconds.

If a plurality of data is recorded in the database 5 at different time intervals, it is necessary to equalize the time intervals when the snapshots are reproduced. Hence, when the first receiving portion 31 receives a plurality of communication-status information items each including information obtained at time intervals different from one another, the first receiving portion 31 may perform a compensation process so that all of the information is displayed at the shortest time interval. For example, a case is considered where the snapshots regarding the number of the wireless terminals connected to the wireless relay 4 are recorded every 10 seconds while the snapshots regarding the channel-usage ratio are recorded every second. In this example, the information with the shortest time interval is that of the channel-usage ratio. Hence, the generating portion 35 performs the compensation process and generates data for display so that the information regarding the number of the wireless terminals connected to the wireless relay 4 is displayed every second.

Here, a method of the compensation process is explained. In the case where the information relating to the number of the wireless terminals connected to the wireless relay 4 and recorded at a certain time means "GOOD", and the information similarly means "GOOD" 10 seconds after that time, for example, the generating portion 35 performs the compensation process assuming that the information is "GOOD" throughout these 10 seconds. In the case where the information relating to the number of the wireless terminals connected to the wireless relay 4 and recorded at a certain time means "GOOD", while the information changes to information meaning "PERMISSION" 10 seconds after this time, the generating portion 35 may perform the compensation process so that the number of the wireless terminals are gradually changed for these 10 seconds. For instance, the generating portion 35 may perform the compensation process so that the information is processed as information meaning "GOOD" for 5 seconds from a certain time and is processed as information meaning "PERMISSION" in the next 5 seconds. The variation mode may be appropriately set.

Note that the standard used for the compensation process is not limited to that in the aforementioned method in which the information is compensated so as to match the shortest time interval. For example, the information is appropriately compensated to have a time interval shorter than the shortest time interval and to have 10 frames in one second.

<Real-Time Function of Wireless Control Device>

Figure 7:
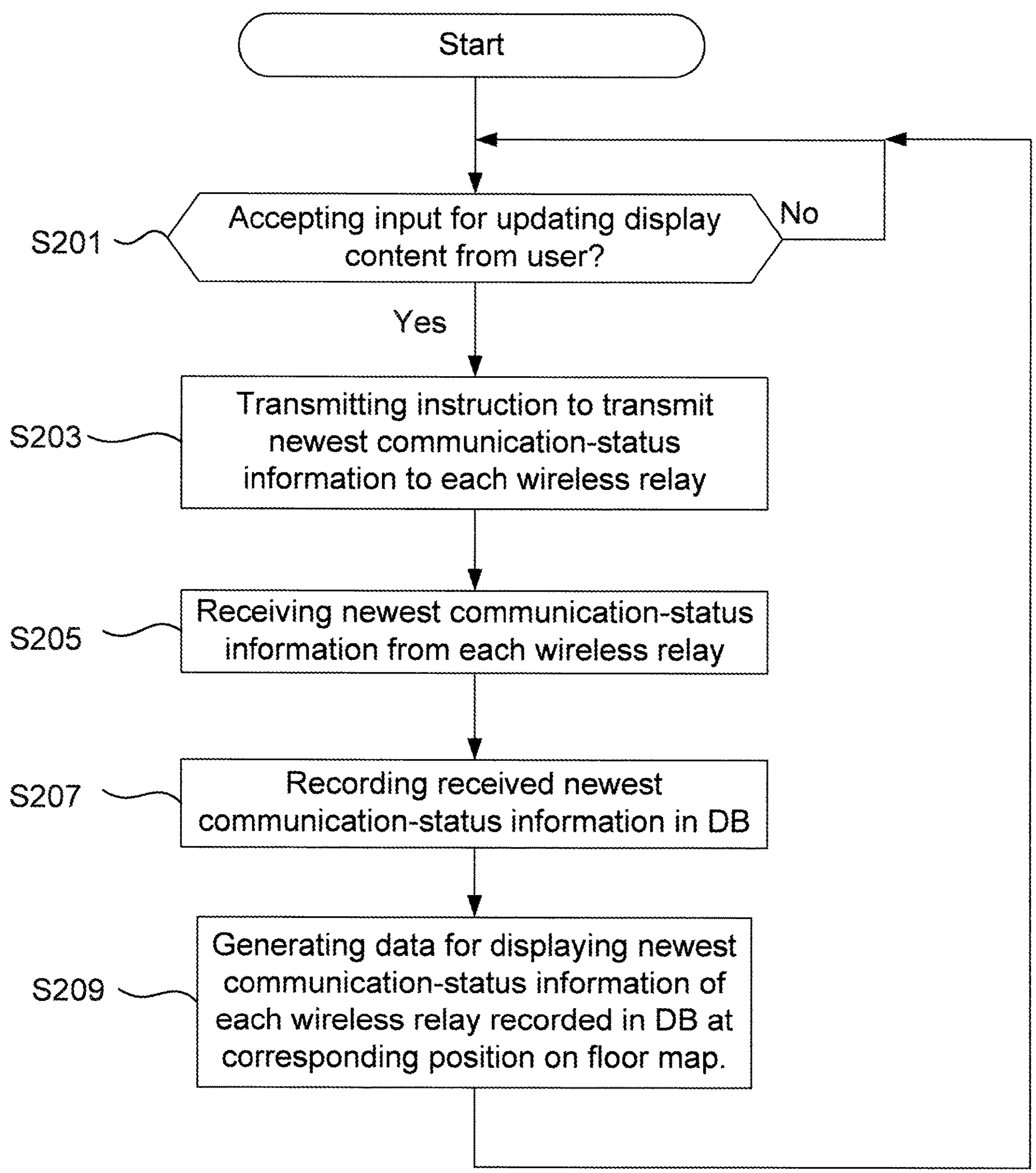
FIG. 7 is a flow chart showing an operation example in a case of utilizing a real-time function of a wireless control device according to an embodiment of the present invention.

Next, a real-time function of the wireless control device 3 is explained using FIG. 7. FIG. 7 is a flow chart showing an operation example in the case of utilizing the real-time function of the wireless control device according to an embodiment of the present invention. In this example, an explanation is given for the case where the wireless device 1 executing the function of the wireless control device 3 is the wireless device 1*a*.

First, the wireless control device 3*a* judges whether an input for updating display content is accepted from a user (Step S201). If the input is not accepted, a process loop until this input is accepted. When the input is accepted (in the case of Yes in Step S201), the wireless control device 3*a* transmits, to each wireless relay 4, an instruction for transmitting the newest communication-status information. The newest communication-status information means communication-status information at the time when the communication-status information is updated in the wireless relay 4. In other words, the newest communication-status information means communication-status information having time information (time stamp) when updated. If the auto-updating button 543 is pressed, it is recognized that the input for updating is accepted in every timing set for the auto-updating.

Next, the first receiving portion 31 receives the newest communication-status information from each wireless relay 4 (Step S205). In other words, after accepting the input for updating the display content, the first receiving portion 31 receives the communication-state information from the wireless relay devices 4. If the first receiving portion 31 cannot receive the newest communication-status information in a predetermined time, the wireless control device 3*a* may request each wireless relay 4 to retransmit the newest communication-status information or may stop the process and wait until the input for updating the display content is input again by the user.

Next, the newest communication-status information received is recorded in the database 5 (Step S207). Next, the generating portion 35 generates data for displaying the newest communication-status information of each wireless relay 4 stored in the database 5 at the corresponding positions in the floor map (Step S209). In this operation example, an explanation is provided for the case where the display portion 50 is located outside the wireless control device 3*a*. However, when the wireless control device 3*a* possesses the display portion 50, the display portion 50 may further display the data generated by the generating portion 35. Similar to the snapshot function, this display is performed using colors or letters indicating "GOOD", "PERMISSION", "ATTENTION", "WARNING", "SERIOUS", and the like.

Accordingly, utilization of the real-time function allows the problems occurring in each wireless relay 4 to be grasped in real time. In addition, since a display is conducted with colors and letters indicating "GOOD", "PERMISSION", "ATTENTION", "WARNING", "SERIOUS", and the like, even a user without technical knowledge can judge the importance of the problems.

<Floor-Map Function of Wireless Control Device>

Figure 8:
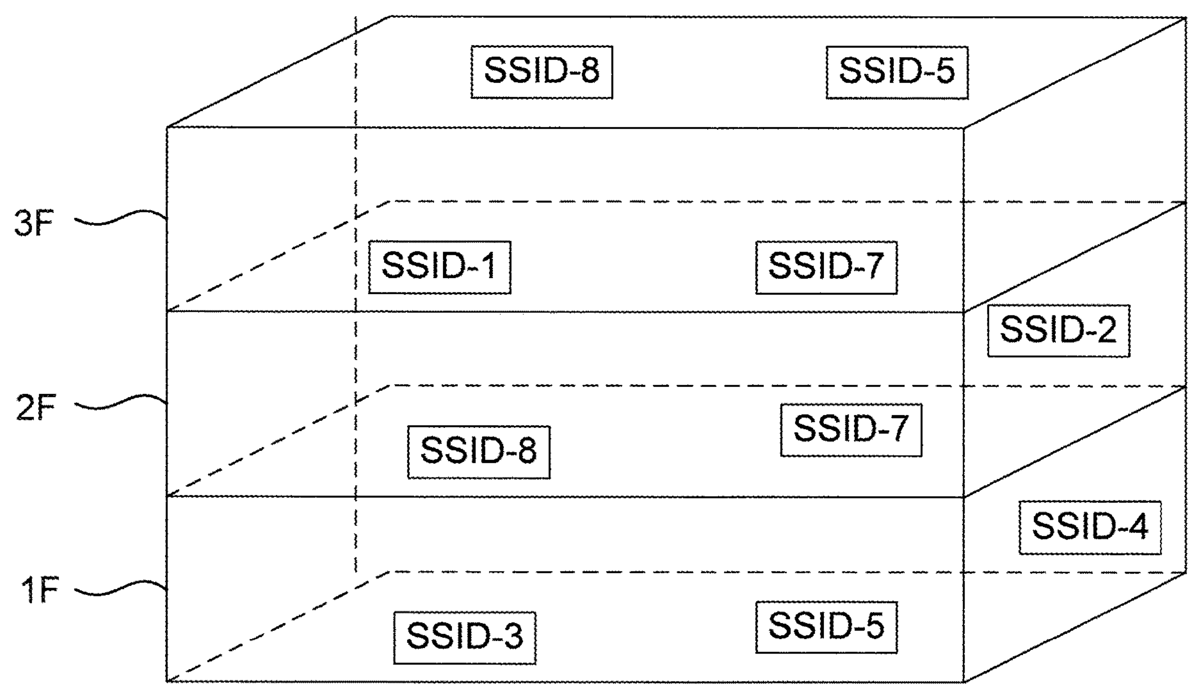
FIG. 8 is a conceptional drawing for explaining a pseudo three-dimensional display of a wireless control device according to an embodiment of the present invention.

Next, a function to display a plurality of floor maps is explained using FIG. 8. FIG. 8 is a conceptional drawing for explaining a pseudo three-dimensional display of the wireless control device according to an embodiment of the present invention.

The generating portion 35 generates data for displaying a communication status at the positions on the screen corresponding to the plurality of wireless relays 4 on the basis of the communication-status information. The generating portion 35 may generate data for pseudo-three-dimensionally displaying the position of each wireless relay 4.

As shown in FIG. 8, the display portion 50 pseudo-three-dimensionally displays the position of the wireless relay 4 on the basis of the data for pseudo-three-dimensionally displaying the position of each wireless relay 4. In FIG. 8, floor information of first to third floors is registered. The display portion 50 may transit the display to a two-dimensional floor-map display shown in FIG. 6 if one of the first to third floors is selected.

As shown in FIG. 8, the snapshot function or the real-time function is used in a state where the position of each wireless relay 4 is pseudo-three-dimensionally displayed. Hence, in the case where a problem occurs in the first floor, the second floor, and the third floor, for example, it is possible to judge that the problem is most serious in the second floor. For instance, red color of "SERIOUS" indicating that the communication environment is not preferred is displayed in the wireless relays 4 in the first floor, the second floor, and the third floor, and the number of the wireless relays 4 in red color is found to be largest in the second floor. In such a case, it is possible to understand that the problem which occurred in the second floor spreads to the first floor and the third floor. Thus, a cause of the problem, which cannot be grasped with a two-dimensionally displayed floor map, can be discovered by pseudo-three-dimensionally displaying the position of each wireless relay 4.

Modified Example 1

Figure 9:
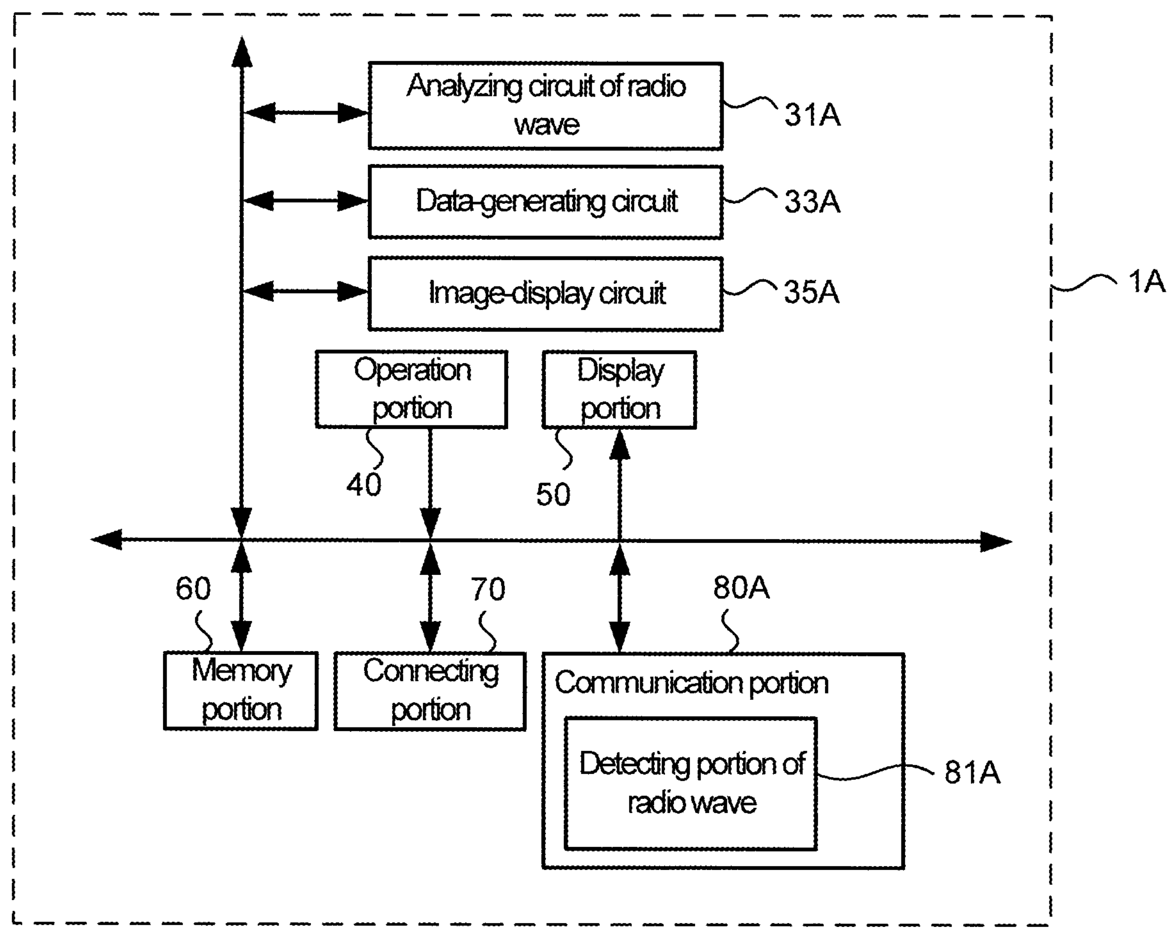
FIG. 9 is a block diagram showing a structure of a wireless device according to a modified example of the present invention.
Figure 10:
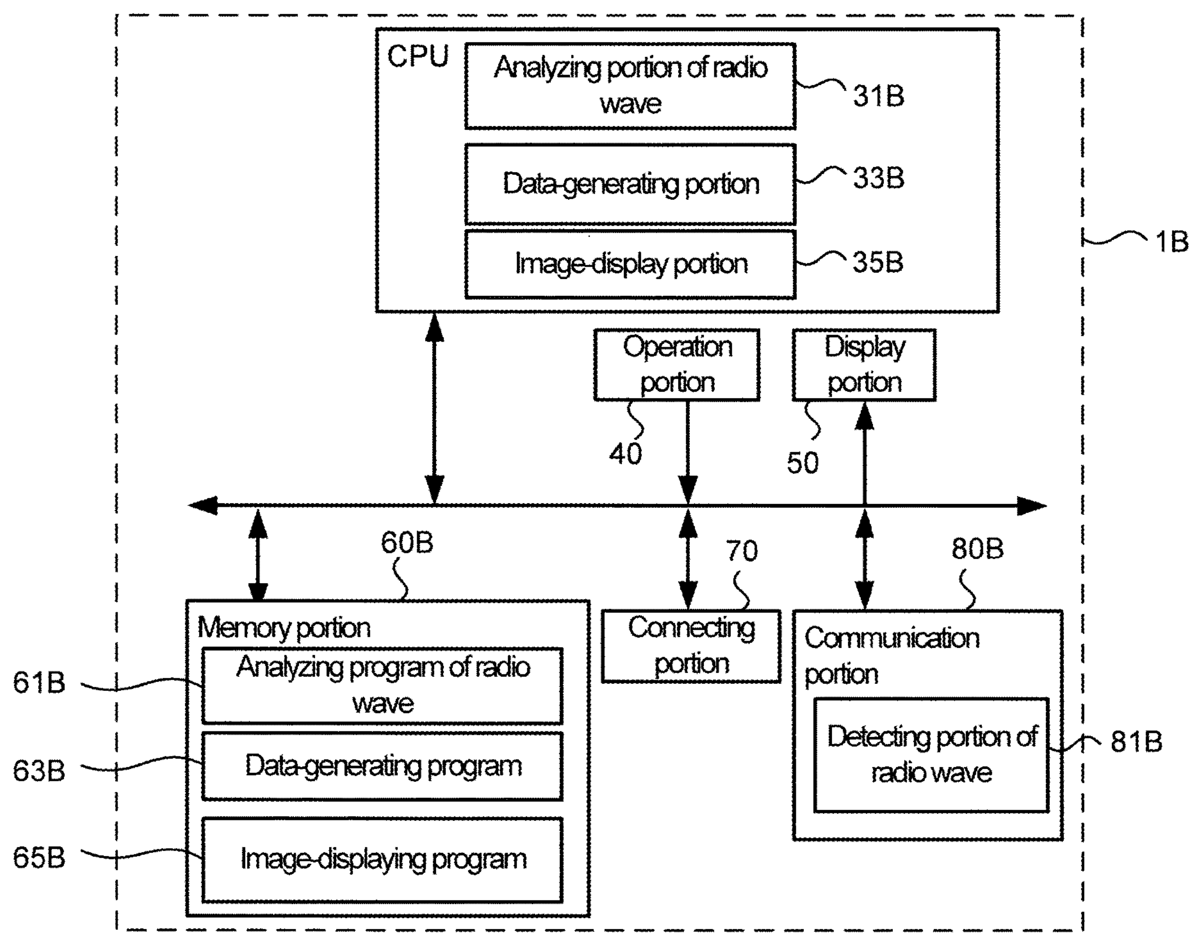
FIG. 10 is a block diagram showing a structure of a wireless device according to another modified example of the present invention.

The wireless device 1 of the aforementioned embodiments can be realized with the following hardware component. FIG. 9 is a block diagram showing a structure of a wireless device according to a modified example of the present invention. An explanation duplicating that of the structure of the wireless device 1 is omitted. As shown in FIG. 10, a wireless device 1A possesses an analyzing circuit of a radio wave 31A, a data-generating circuit 33A, and an image-displaying circuit 35A. The controlling portion 30 of the wireless device 1 is realized by the analyzing circuit of a radio wave 31A, the data-generating circuit 33A, and the image-displaying circuit 35A. Although a communication portion 80A includes a detection portion of a radio wave 81A in this example, the communication portion 80A may be composed of another circuit. The detection portion of a radio wave 81A detects a received radio wave. The analyzing circuit of a radio wave 31A quantifies information of the detected radio wave. The analyzing circuit of radio wave 31A corresponds to the first receiving portion 31 of the wireless device 1. The data-generating circuit 33A generates data for displaying an image such as an icon of a SSID. The data-generating circuit 33A corresponds to the generating portion 35 of the wireless device 1. The image-displaying circuit 35A determines a drawing position. In the present modified example, the effects the same as those of the aforementioned embodiments can be also obtained.

Modified Example 2

The wireless device 1 of the aforementioned embodiments can be realized with the following software component. FIG. 10 is a block diagram showing a structure of a wireless device according to another modified example of the present invention. As shown in FIG. 10, an analyzing program of a radio wave 61B, a data-generating program 63B, and an image-displaying program 65B are stored in a memory portion 60B. Unlike the wireless device 1, a program realizing a function of a CPU is divided into a plurality of programs. A detecting portion of a radio wave 81 detects a received radio wave. An analyzing portion of a radio wave 31B of the CPU executes the analyzing program of a radio wave 61B stored in the memory portion 60B and quantifies information of the detected radio wave. The analyzing portion of a radio wave 31B corresponds to the first receiving portion 31 of the wireless device 1. A date-generating portion 33B of the CPU executes the data-generating program stored in the memory portion 60B and generates data for displaying an image such as an icon of a SSID. The data-generating portion 33B of the CPU corresponds to the generating portion 35 of the wireless device 1. An image-displaying portion 35B of the CPU executes the image-displaying program 61B stored in the memory portion 60B and determines a drawing position. In the present modified example, the effects the same as those of the aforementioned embodiments can be also obtained.

<Web Application>

In the aforementioned description, an explanation is given on the assumption that the snapshot function or the real-time function is realized in the display portion 50 of the wireless control device 3 or a display portion outside the wireless control device 3. The present invention is not limited thereto. For example, the communication-state information of the plurality of wireless relays 4 received by the wireless control device 3 may be forwarded so as to be displayed with a Web application.

Note that the present invention is not limited to the aforementioned embodiments and may be appropriately modified without departing from the concept.

What is claimed is:

1. A method realized by a first wireless device and a second wireless device each comprising a wireless control device and a wireless relay, the method comprising:

generating, by the wireless relay of the first wireless device, first communication-status information in accordance with a communication status between the first wireless device and with a wireless terminal;

transmitting, by the wireless relay of the first wireless device, the first communication-status information to the wireless control device of the first wireless device;

generating, by the wireless relay of the second wireless device, second communication-status information in accordance with a communication status between the second wireless device and another wireless terminal;

transmitting, by the wireless relay of the second wireless device, the second communication-status information to the wireless control device of the first wireless device;

receiving, by the wireless control device of the first wireless device, the first communication-status information and the second communication-status information;

generating, by the wireless control device of the first wireless device, data for displaying the first communication-status information and the second communication-status information at positions on a screen of the first wireless device, the positions corresponding to the first wireless device and the second wireless device; and transmitting, by the wireless control device of the first wireless device, a modifying signal to the wireless relay of the second wireless device when the first communication-status information satisfies a predetermined requirement, wherein the modifying signal is a signal for causing the wireless control device of the second wireless device to receive the first communication-status information and the second communication-status information from the wireless control device of the first wireless device and the wireless control device of the second wireless device, respectively.

2. The method according to claim 1, wherein each of the wireless control devices, each of the wireless relays, and each of the wireless devices are each a wireless access point.

3. A wireless device comprising:

a wireless control device;

a wireless relay; and a processor configured to execute instructions to:

generate first communication-status information in the wireless relay in accordance with a communication status between the wireless device and a wireless terminal;

receive the first communication-status information transmitted from the wireless relay with the wireless control device;

receive second communication-status information transmitted from a plurality of second wireless devices; and generate data for displaying communication status included in the first communication-status information and the second communication-status information at positions on a screen of the wireless device, the positions corresponding to the wireless control device and the plurality of second wireless devices.

4. The wireless control device according to claim 3, wherein the processor is further configured to execute instructions of receiving, after receiving an input for selecting a period, the first communication-status information and the second communication-status information corresponding to the period.

5. The wireless control device according to claim 3, wherein the processor is further configured to execute instructions of receiving, after receiving an input for updating display content, the first communication-status information and the second communication-status information.

6. The wireless control device according to claim 3, wherein the processor is further configured to execute the instructions to:

select one of the second communication statuses of the plurality of second wireless devices in accordance with the second communication-status information; and generate data for displaying the selected communication status.

7. The wireless control device according to claim 3, wherein the processor is further configured to execute the instructions to compensate, when a plurality of information items recorded at different time intervals is included in the second communication-status information, to generate data for displaying the communication status at the shortest time interval.

8. The wireless control device according to claim 3, wherein the first communication-status information and the second communication-status information each include information regarding communication quality.

9. The wireless control device according to claim 3, wherein the instructions are performed by at least one processing circuit included in the wireless control device.

10. A method realized by a first wireless device and a second wireless device, the method comprising:

transmitting communication-status information in accordance with a communication status of the first wireless device with a wireless terminal from the first wireless device to the first wireless device;

transmitting communication-status information in accordance with a communication status of the second wireless device with another wireless terminal from the second wireless device to the first wireless device; and generating, by the first wireless device, data for displaying the communication-status information of the second wireless device at a position on a screen of the first wireless device, the position corresponding to the second wireless device.

11. The method according to claim 10, wherein each of the first and second wireless devices is a wireless access point.

12. The method according to claim 10, further comprising:

transmitting a modifying signal from the first wireless device to the second wireless device when the communication-status information of the first wireless device satisfies a predetermined requirement, and wherein the modifying signal is a signal for causing the second wireless device to receive the communication-status information of the first wireless device from the first wireless device and the communication-status information of the second wireless device from the second wireless device.

13. The method according to claim 12, further comprising generating, by the second wireless device, data for displaying the communication-status information of the first wireless device at a position on a screen of the second wireless device, the position corresponding to the first wireless device.

14. The method according to claim 10, further comprising:

receiving, by the first wireless device, an input for selecting a period, wherein the communication-status information of the second wireless device is obtained by the second wireless device during the period.

15. The method according to claim 10, further comprising:

receiving, by the first wireless device, an input for updating display content corresponding to the data; and receiving again, by the first wireless device, the communication-status information of the second wireless device from the second wireless device after receiving the input.

16. The method according to claim 10, further comprising, when a plurality of information items recorded at different time intervals are included in the communication-status information of the second wireless device, compensating to generate data for displaying the communication status of the second wireless device at the shortest time interval.

17. The method according to claim 10, wherein the communication-status information of the first wireless device and the communication-status information of the second wireless device each include information regarding communication quality.

18. The method according to claim 17, wherein the information regarding the communication quality is at least one of a rate of transmission between the wireless terminal and second wireless device, intensity of a signal received from the wireless terminal at the second wireless device, a retransmitting rate of a packet from the wireless terminal to the second wireless device, the number of disconnections of wireless communication between the wireless terminal and the second wireless device, the number of wireless terminals connected to the second wireless device, a channel-usage ratio of the second wireless device, or a generation rate of a CRC error.

19. The method according to claim 10, wherein the communication-status information of the first wireless device and the communication-status information of the second wireless device each include information regarding the wireless terminals connected to the first wireless device and the second wireless device, respectively.

20. The method according to claim 19, wherein the information regarding the wireless terminals is at least one of a MAC address, a media type, or an authentication mode of the wireless terminal.

21. The method according to claim 10, wherein the data is for pseudo-three-dimensionally displaying the position of the second wireless device.

* * * * *